March 31, 1931.  J. H. WAGENHORST  1,798,643
AUTOMOBILE WHEEL
Filed June 23, 1921

Inventor
J. H. Wagenhorst.
By
Hull Brock & West.
Attys.

Patented Mar. 31, 1931

1,798,643

UNITED STATES PATENT OFFICE

JAMES H. WAGENHORST, OF JACKSON, MICHIGAN

AUTOMOBILE WHEEL

Application filed June 23, 1921. Serial No. 479,716.

This invention relates generally to vehicle wheels, the object being to provide an exceedingly light and at the same time a strong and durable wheel particularly adapted for use upon motor vehicles and has special reference to vehicle wheels demountable at the hub.

Another object of the invention is to provide a vehicle wheel which shall be simple and inexpensive in manufacture and a still further object is to provide a wheel of this type which can be made to receive either a clincher or straight side tire. With these various objects in view the invention consists in the novel features of construction and combination hereinafter fully described and pointed out in the appended claims.

Figure 1:
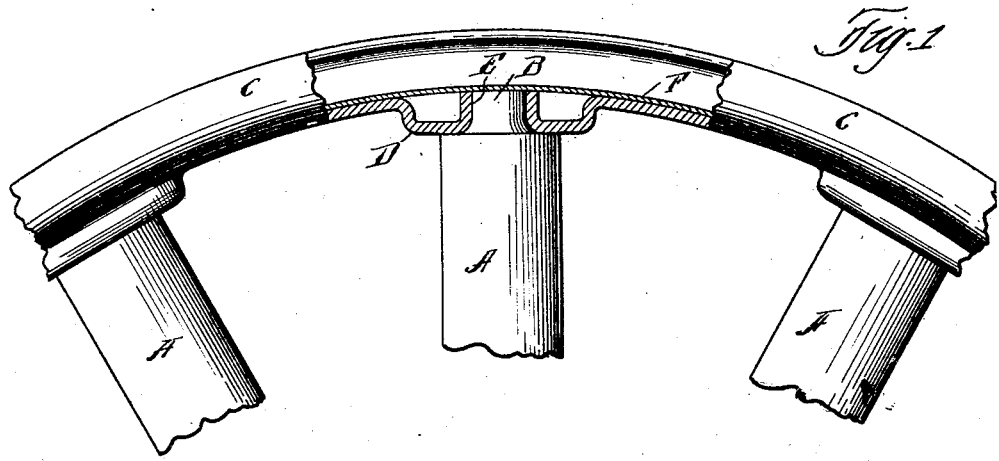
Figures 2, 5:
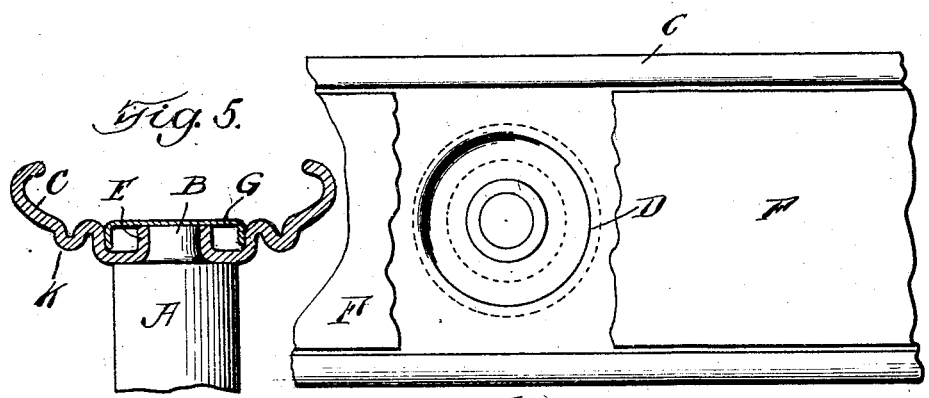
Figure 3:
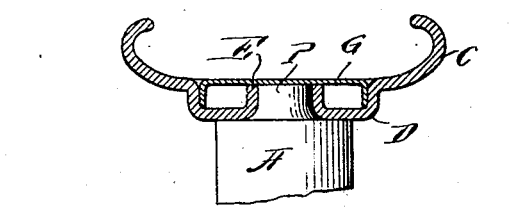
Figure 4:

In the drawings forming a part of this specification, Fig. 1 is a view partly in elevation and partly in section illustrating a portion of a wheel embodying one form of my invention; Fig. 2 is a detail plan view, certain parts being broken away to more clearly illustrate the spoke receiving socket of the rim; Fig. 3 is a detail sectional view of one form; Fig. 4 is a sectional view through the rim and filler band taken at the valve stem hole; and Fig. 5 is a detailed sectional view through a slightly modified form of rim.

In carrying out my invention I employ a plurality of spokes A which are preferably made of wood and provided at their outer ends with tenons B. In Figs. 1, 2 and 3 the rim C is of the clincher type and is formed at definite intervals with inwardly projecting bosses D preferably circular in shape and each inwardly projecting boss D is formed with an outwardly extending tenon receiving socket E, the tenon B at the end of the spoke A being forced into the outwardly extending socket E and the shoulder on the spoke at the base of the tenon being brought into firm contact with the inwardly projecting boss D.

In order to protect the tire from contact with the spoke end and the outwardly projecting tenon socket E, I may provide a filler band or strip F which rests upon the base of the rim as most clearly shown in Figs. 1 and 2 or I may provide a flanged circular plate G as shown in Fig. 3 which flanged plate will fit into the inwardly projecting circular boss D and extend across the spoke end and the outwardly projecting socket portion E. In Fig. 5 the rim C of the clincher type is formed with inwardly projecting beads K for the purpose of stiffening the rim as a whole and thereby permitting an exceedingly light rim to be used in connection with the wooden spokes in order to provide an exceedingly light and at the same time a strong and durable wheel body. In connection with the rim having the reinforcing inrolled beads I may employ the inwardly projecting bosses D as shown in Fig. 5. It will be understood that in case the rim having the inrolled beads is provided with the inwardly extending bosses D, a filler plate F may be arranged upon the base of the rim C, or the flange plates G may be employed as preferred.

In Fig. 4 I have shown one means of connecting the filler plate to the rim base by means of a tubular rivet F' in the valve stem hole.

In Fig. 5 I have shown a sectional view of the rim having the inrolled reinforcing beads and also the inwardly projecting bosses having the outwardly extending spoke receiving sockets.

It will thus be seen that I provide an exceedingly simple wheel body consisting as it does of the tire carrying rim and the plurality of spokes which may be of wood or of metal as preferred. By means of the inrolled reinforcing beads I am able to provide an exceedingly light and at the same time strong and durable rim capable of carrying the usual loads and strains to which a wheel of this character would be subjected, and by means of my improved spoke connections between the tire carrying rim and spoke ends I am able to provide a positive and firm connection between the spoke and rim, one which will not injure the tire and one which will not become loose during ordinary wear and travel.

In the manufacture of wheels the great problem is to provide a wheel which has adequate strength to meet all of the stresses imposed upon it in use but which is at the same time as light as possible and as inexpensive to manufacture as possible. The wheel construction which I have disclosed herein lends itself admirably to these ends. The outwardly extending flange E projecting from the base of the boss D forms a socket which receives the tenon B of the spoke and provides a substantial wall resisting the lateral forces which tend to shear the tenon. The inner face or base of the boss D provides a substantial flat surface engaged by the shoulder on the spoke at the base of the tenon to transmit load and radial forces. The base of the rim C is normally curved but the depression of the bosses D in the rim base provides flat surfaces lying in planes perpendicular to the axes of the spokes. The bosses D also serve to strengthen the span of the rim C between spokes. These bosses act like ribs to reinforce and strengthen the rim and this is accomplished without any increase in weight. The bosses D are integral with the base of the rim, so that no new parts are added and the spokes are connected directly to the tire carrying rim. The filler band F or the filler plates G cover the openings formed by the bosses D and maintain a suitable seat for the tire. This construction, therefore, provides a light and inexpensive wheel which is strong enough to meet the strains imposed upon it in use.

Having thus described my invention, what I claim is:

1. In a wheel, the combination of a tire carrying rim having a rim base depressed at intervals to form a plurality of circumferentially spaced inwardly projecting bosses, each boss having a central opening in its base surrounded by an outwardly extending flange forming a socket, and spokes having tenons disposed in said sockets and shoulders at the bases of such tenons seating against the inner faces of said bosses, each of said inner faces being substantially perpendicular to the axis of the corresponding spoke.

2. In a wheel, the combination of a tire carrying rim having a rim base depressed inwardly at intervals to form socketed bosses, spokes having tenons received in the sockets of said bosses, a filler band carried by said rim and closing the openings formed by said bosses so as to provide a suitable tire seat, and a tubular rivet securing said filler band to said rim and adapted to receive a valve stem.

3. In a wheel, the combination of a tire-carrying rim having a rim base depressed inwardly at intervals to form a plurality of inwardly extending bosses, the base of each boss being flanged outwardly to provide a central socket therein, and spokes having tenons received in said sockets and shoulders engaging the bases of said bosses, the base of each boss being substantially perpendicular to the axis of the corresponding spoke.

4. In a wheel, the combination of a tire-carrying rim having a rim base depressed inwardly at intervals to form a plurality of inwardly extending bosses, each boss having its base provided with a central outwardly projecting flange forming a socket therein, and spokes having tenons received in said sockets and shoulders engaging the bases of said bosses, the area of the base of each boss being substantially greater than the cross section of the corresponding spoke.

In testimony whereof, I hereunto affix my signature.

JAMES H. WAGENHORST.